United States Patent
Ananthanarayanan et al.

(10) Patent No.: US 8,265,679 B2
(45) Date of Patent: Sep. 11, 2012

(54) BUNDLING OF COMMUNICATION SIGNALS FOR EFFICIENCY

(75) Inventors: Arulmozhi K. Ananthanarayanan, San Diego, CA (US); Harleen K. Gill, SAn Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 12/438,089

(22) PCT Filed: Sep. 28, 2007

(86) PCT No.: PCT/US2007/079855
§ 371 (c)(1),
(2), (4) Date: Feb. 19, 2009

(87) PCT Pub. No.: WO2008/039973
PCT Pub. Date: Apr. 3, 2008

(65) Prior Publication Data
US 2010/0004012 A1    Jan. 7, 2010

Related U.S. Application Data

(60) Provisional application No. 60/827,428, filed on Sep. 28, 2006.

(51) Int. Cl.
*H04B 7/00* (2006.01)
(52) U.S. Cl. ........ 455/518; 370/231; 370/329; 370/216; 370/242; 455/428; 455/406; 455/312

(58) Field of Classification Search .......... 455/500–528, 455/452.1, 450, 451, 414.1; 370/329, 356, 370/202, 338, 349, 352, 468, 404, 238, 445, 370/524
See application file for complete search history.

(56) References Cited

U.S. PATENT DOCUMENTS

| | | | |
|---|---|---|---|
| 6,411,815 B1 | 6/2002 | Senaka | |
| 7,418,004 B2* | 8/2008 | Chou | 455/509 |
| 7,664,517 B2* | 2/2010 | Ananthanarayanan et al. | 455/520 |
| 7,688,811 B2* | 3/2010 | Kubler et al. | 455/503 |
| 7,830,836 B2* | 11/2010 | Wan | 370/329 |
| 2001/0036113 A1 | 11/2001 | Jurgensen et al. | |
| 2001/0038620 A1 | 11/2001 | Stanwood et al. | |
| 2002/0123314 A1 | 9/2002 | Kitazawa et al. | |

(Continued)

FOREIGN PATENT DOCUMENTS

JP    2001352573 A    12/2001

(Continued)

OTHER PUBLICATIONS

International Search Report—PCT/US2007/079855, International Searching Authority-European Patent Office-Feb. 20, 2008.

(Continued)

*Primary Examiner* — Lam T Mai
(74) *Attorney, Agent, or Firm* — Raphael Freiwirth

(57) ABSTRACT

Systems and methods for bundling signals in a wireless communication system are disclosed. A connection request and a reservation for QoS resources can be bundled into an access message at an access terminal. The access message with the bundled communication signals can then be transmitted to an access network. An application layer (e.g., a DataOverSignaling (DOS)) message can also be bundled with the connection request and the reservation into the access message.

26 Claims, 9 Drawing Sheets

U.S. PATENT DOCUMENTS

| | | | |
|---|---|---|---|
| 2002/0126633 A1 | 9/2002 | Mizutani et al. | |
| 2003/0103520 A1 | 6/2003 | Chen et al. | |
| 2003/0112766 A1 | 6/2003 | Riedel et al. | |
| 2004/0192363 A1 | 9/2004 | Rosetti et al. | |
| 2004/0203658 A1 | 10/2004 | Narayanan | |
| 2005/0043024 A1 | 2/2005 | Shiga | |
| 2005/0250523 A1 | 11/2005 | Lemke et al. | |
| 2005/0288047 A1 | 12/2005 | Ananthanarayanan et al. | |
| 2006/0072526 A1 | 4/2006 | Rasanen | |
| 2007/0058661 A1* | 3/2007 | Chow | 370/445 |
| 2009/0185527 A1 | 7/2009 | Akhtar et al. | |
| 2010/0172306 A1 | 7/2010 | Gill et al. | |
| 2010/0214996 A1* | 8/2010 | Santhanam et al. | 370/329 |
| 2011/0211439 A1* | 9/2011 | Manpuria et al. | 370/216 |
| 2011/0292798 A1* | 12/2011 | Manpuria | 370/231 |

FOREIGN PATENT DOCUMENTS

| | | |
|---|---|---|
| JP | 2002204481 A | 7/2002 |
| JP | 2002281564 A | 9/2002 |
| JP | 2003169363 A | 6/2003 |
| JP | 2004289841 A | 10/2004 |
| JP | 2004535729 | 11/2004 |
| JP | 2005057394 | 3/2005 |
| JP | 2005277911 A | 10/2005 |
| JP | 2006094179 A | 4/2006 |
| JP | 2006108790 A | 4/2006 |
| JP | 2008503989 A | 2/2008 |
| JP | 2008533836 A | 8/2008 |
| RU | 2006102360 | 8/2006 |
| WO | WO03007560 A1 | 1/2003 |
| WO | 2005086501 | 9/2005 |
| WO | WO2005094096 A1 | 10/2005 |
| WO | WO2005015031 | 12/2005 |
| WO | WO 2006002218 | 1/2006 |
| WO | WO2006038083 A1 | 4/2006 |
| WO | WO 2006099062 A1 | 9/2006 |

OTHER PUBLICATIONS

Written Opinion—PCT/US2007/079855, International Searching Authority-European Patent Office-Feb. 20, 2008.

European Search Report—EP10173201—Search Authority—Munich—Oct. 6, 2010.

Fabrice Valois, et al., "QOS-Oriented Channel Assignment Strategy for Hierarchical Cellular Networks", pp. 1599-1603, IEEE, (2000).

S.Paskalis, et al.,"An Efficient RSVP-Mobile IP Interworking Scheme ", pp. 197-207, Kluwer Academic Publishers, (2003).

* cited by examiner

BUNDLING OF COMMUNICATION SIGNALS FOR EFFICIENCY

The present application claims priority to PCT Patent Application No. PCT/US2007/079855 filed Sep. 28, 2007 which claims priority to provisional U.S. Application Ser. No. 60/827,428, entitled "SIMULTANEOUS RESOURCE ACTIVATION TO REDUCE SESSION SETUP LATENCY," filed Sep. 28, 2006, and assigned to the assignee hereof and hereby expressly incorporated by reference herein.

BACKGROUND OF THE INVENTION

1. Field of the Invention

The invention relates to communications in a wireless telecommunication system and more particularly to bundling communication signals that are originated by an access terminal.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

The group communication or PTT call is generally initiated from an originating access terminal that sends the initial request for the group communication. Conventional systems require multiple communications from the originator to establish communication links to the wireless network/group communication infrastructure to enable the establishment of the group call. These multiple communications can lead to additional delay in establishing the group call and therefore a degradation in the overall user experience.

SUMMARY OF THE INVENTION

Exemplary embodiments of the present invention are directed to a system and method for bundling communication signals that are originated by an access terminal in a wireless communication system.

Accordingly, an embodiment of the invention can include a method for transmitting communication signals in a wireless network comprising: bundling a connection request and a reservation for QoS resources into an access message at an access terminal; and transmitting the access message to an access network.

Another embodiment of the invention can include an access terminal comprising: logic configured to bundle a connection request and a reservation for QoS resources into an access message; and logic configured to transmit the access message to an access network.

Another embodiment of the invention can include a computer-readable medium including code stored thereon for bundling communication messages in a wireless network comprising: code for causing a computer to bundle a connection request and a reservation for QoS resources into an access message; and code for causing a computer to transmit the access message to an access network.

Another embodiment of the invention can include an apparatus comprising: means for bundling a connection request and a reservation for QoS resources into an access message; and means for transmitting the access message to an access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
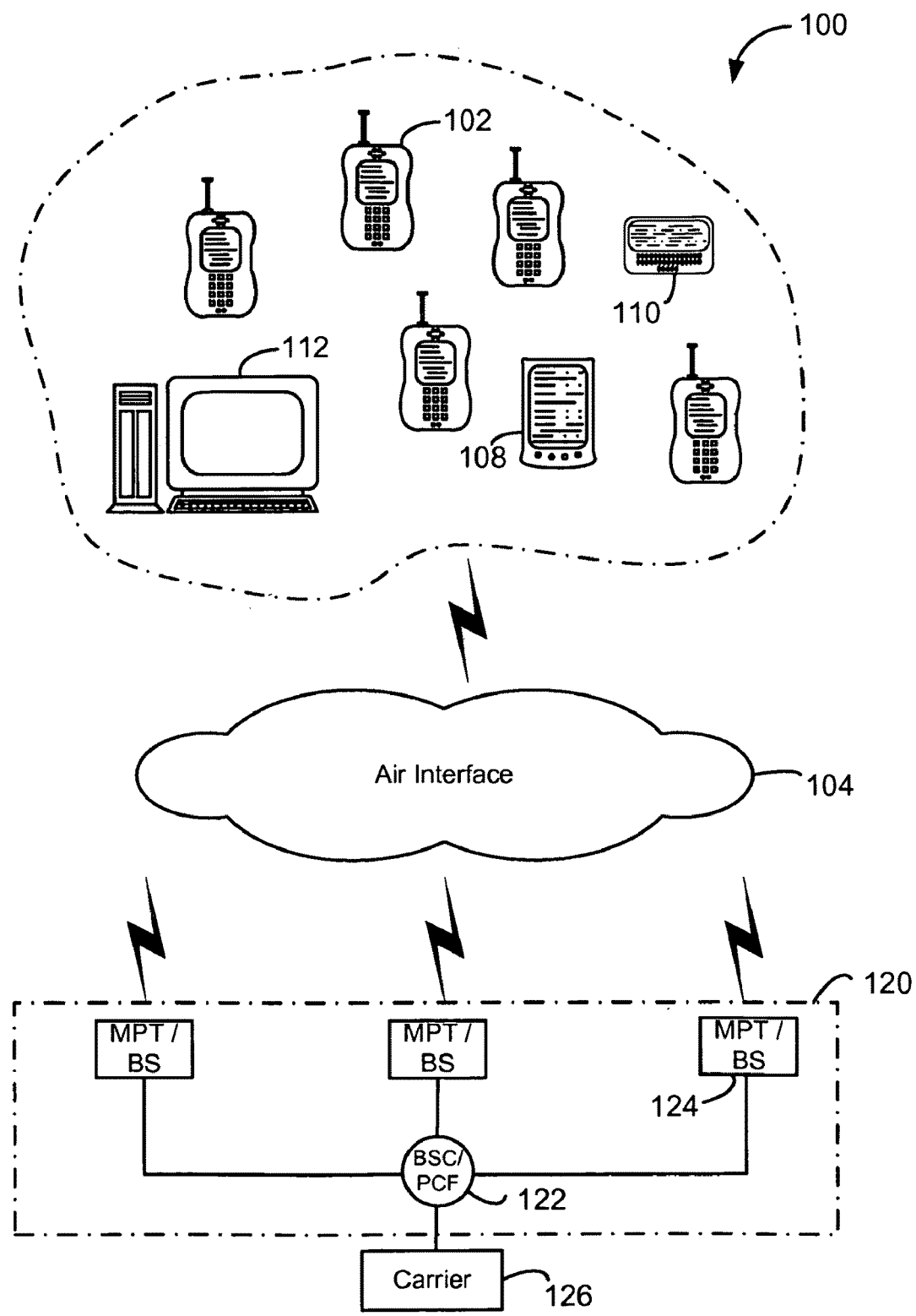
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station (e.g. a 1xEV-DO enabled wireless device), referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network (AN) (also referred to herein as a radio access network (RAN)) transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
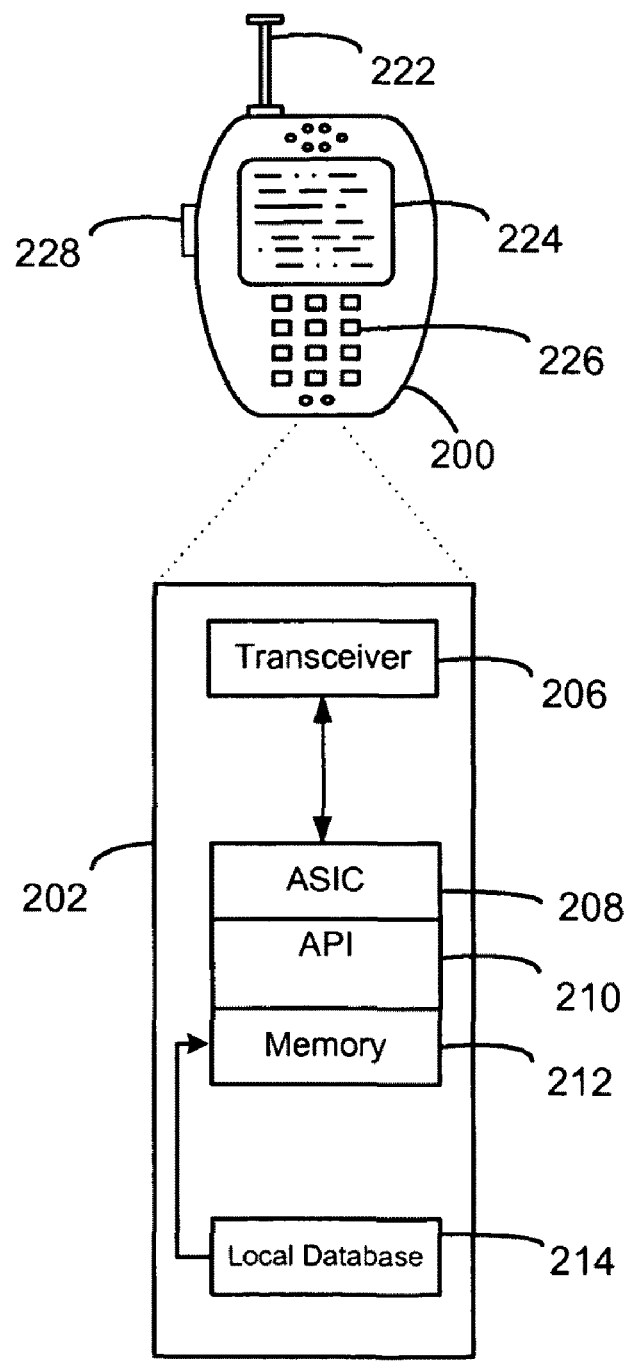
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. For example, the access terminal can include logic configured to bundle a connection request and a reservation for QoS resources into an access message and logic configured to transmit the access message to an access network. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the access network using a variety of networks and configurations. Accordingly, the illustrations provided herein are not intended to limit the embodiments of the invention and are merely to aid in the description of aspects of embodiments of the invention.

Figure 3A:
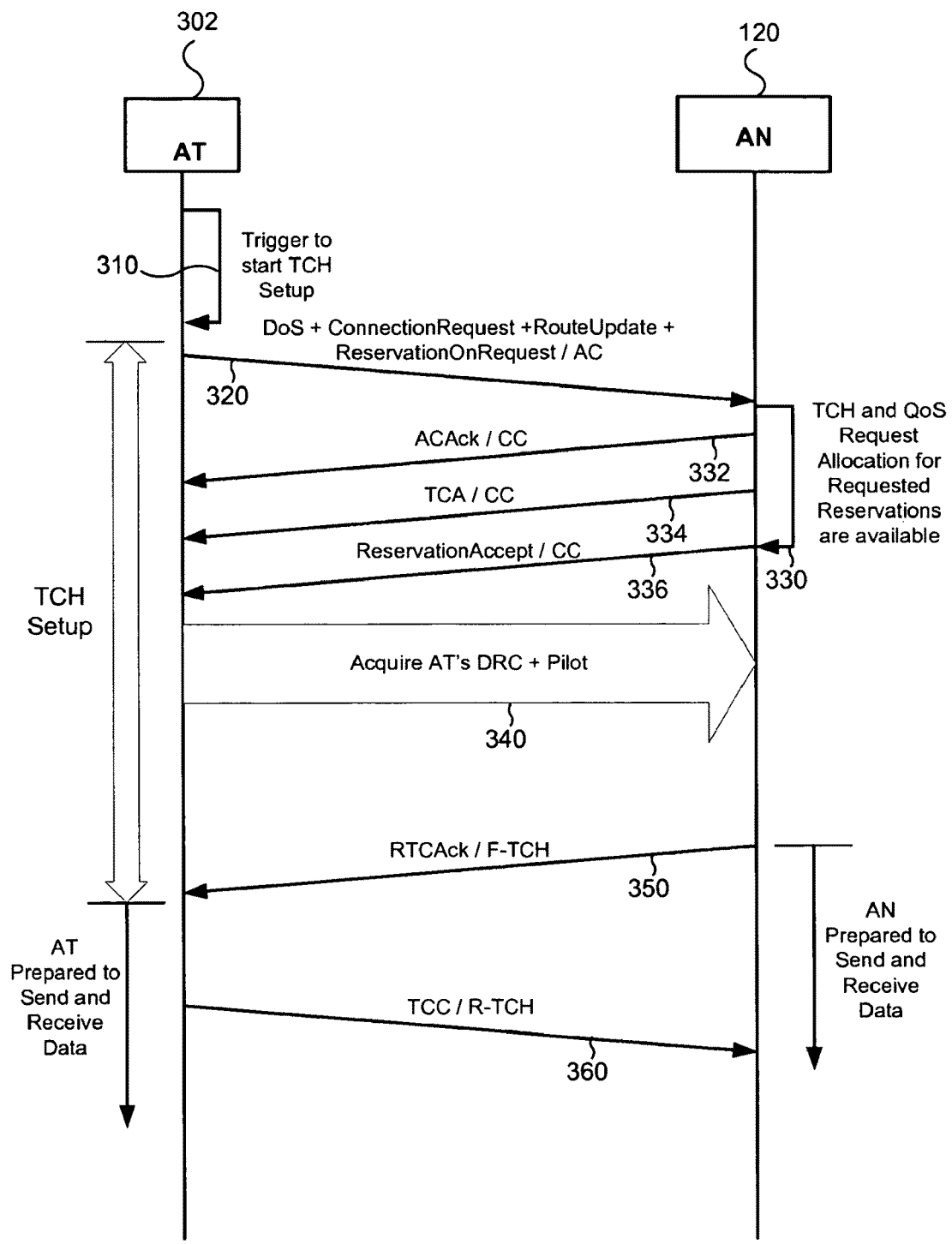
FIGS. 3A-3C are signal flow diagrams in accordance with embodiments of the invention.

FIG. 3A illustrates a flow diagram for bundling communications in accordance with embodiments of the invention. In 310, there is an initial trigger at an access terminal (AT) 302 to establish the communication request (e.g., a PTT button 228 is pressed) and the information needed to establish the communication with the access network (AN) 120 is bundled into an access channel message (e.g., a connection request (ConnectionRequest and route update information (RouteUpdate)), provisioning for any QoS services used for the communication (ReservationOnRequest), etc.). Additionally, application layer data (e.g. a DataoverSignaling (DOS) message) may also be bundled in the access channel message to expedite communication with an end application (e.g., the group server, application resident on another AT, etc.) Once the access message is bundled with the desired information (e.g., DOS+ConnectionRequest+RouteUpdate+ReservationOnRequest), the access message can be sent 320 over the access channel (AC) to the access network (AN) 120.

Once the bundled message 320 is received at the access network 120, the access network can process the request 330. In 330, the access network can allocate a traffic channel (TCH) and the requested QoS resources for the requested reservations, assuming the traffic channel and QoS resources are available. Specifically, the access network 120 can acknowledge the access message (ACAck), 332, transmit a traffic channel assignment (TCA), 334, and transmit a reservation accept message (ReservationAccept), 336. These messages can be transmitted on a control channel (CC) to AT 302. A data rate control (DRC) message can be sent, 340, from the AT 302 to establish a data communication rate with the AN 120. After successfully receiving and decoding the DRC and pilot, the AN 120 can transmit a Reverse Traffic Channel Acknowledge (RTCAck) message, 350, on the forward traffic channel (F-TCH). Upon receipt of the RTCAck message, the AT 302 can send a Traffic Channel Complete (TCC) message, 360, on the reverse traffic channel (R-TCH). Dedicated channels are then established in both the forward and reverse directions and the AT 302 and the AN 120 can both communicate data bidirectionally. The various messages communicated between access terminal 302 and access network 120 are known in the art and are documented in 3GPP2 C.S0024-A Version 3.0, cdma2000 High Rate Packet Data Air Interface, dated Sep. 12, 2006, which is incorporated herein by reference in its entirety. Accordingly, a detailed explanation of the setup procedures and messages will not be provided herein.

If the DOS message or other application layer message is optionally bundled in the connection request access message, that information does not impact the traffic channel setup, discussed in the foregoing. Generally, the application specific data can be detected and merely passed on to the appropriate destination by AN 120. However, the application specific information may further reduce latency in delay sensitive applications by providing data needed (e.g., a PTT call request) for further processing by remote applications (e.g., a PTT server) to establish the data communication (e.g., a PTT call) once the traffic channels are setup between AT 302 and AN 120. Accordingly, the data included in the application layer message does not have to wait for the establishment of the traffic channels between the AT 302 and AN 120 before being forwarded to the network.

As will be appreciated by those skilled in the art the QoS resources needed may vary for different applications or within applications. The following examples describe QoS design under different QoS resource scenarios:

When traffic channel resources and QoS resources (e.g., In-Call Signaling and Media reservations) are available in the sector of the originator AT 302 sector, the RAN signals that QoS resources are available for both the forward and reverse links by transmitting FwdReservationOn and RevReservationOn messages for the In-Call Signaling and Media reservations. This case is illustrated in FIG. 3A and described in the foregoing description.

Figure 3B:
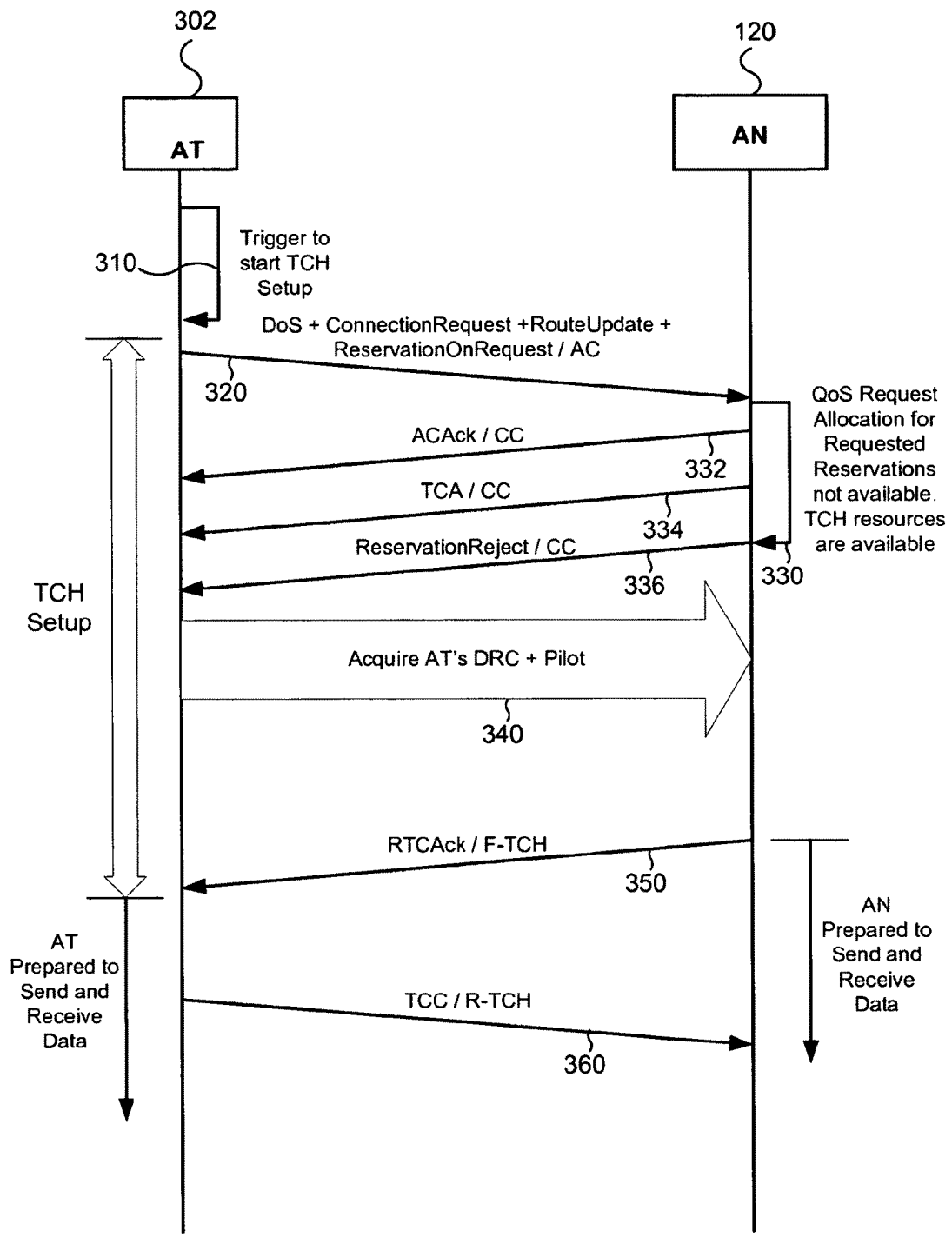

When traffic channel resources are available in the sector where the originator AT 302 is located, but QoS resources for some or all of the reservations are not available, the AN 120 can still allocate the traffic channel and transmits the TCA message to the originator AT 302. However, the AN 120 rejects the QoS request for the reservations it cannot provision by transmitting a ReservationReject message to AT 302. The availability of the traffic channel enables the AT 302 to attempt to complete its call setup signaling handshake over the traffic channel when the QoS resources (e.g., In-Call Signaling and Media reservations) are not available. This case is illustrated in FIG. 3B.

Figure 3C:
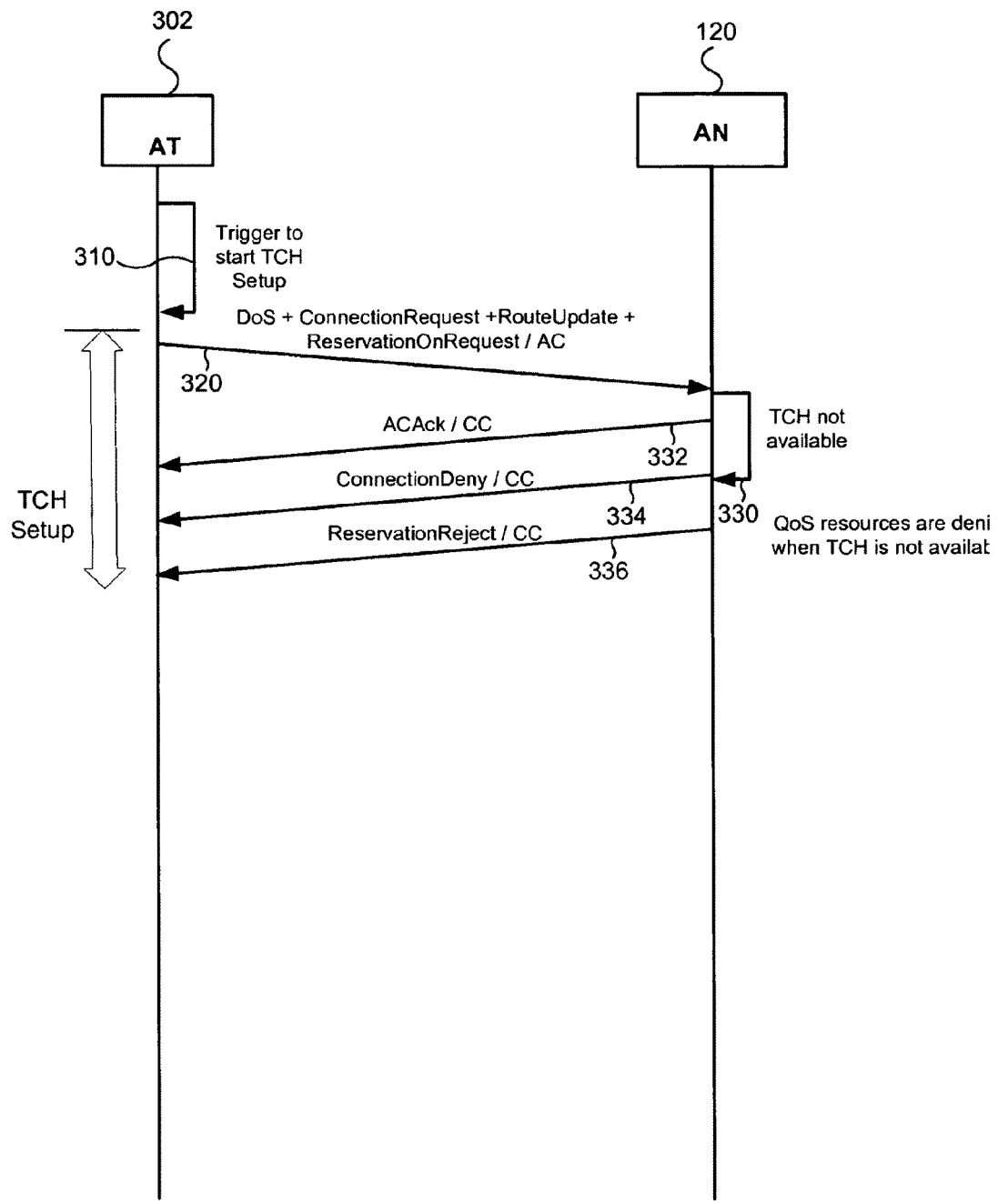

When no traffic channel resources are available in the originator AT's sector, the AN denies the traffic channel request by transmitting the ConnectionDeny message (e.g., per the 1xEV-DO Revision A standard). In this case the QoS request for the reservations also is denied by transmitting a ReservationReject message to AT 302. This case is illustrated in FIG. 3C.

If some of the In-Call Signaling and Media reservations are already allocated to the originator AT at the time of arrival of a call setup packet, the AN/RAN may only activate the In-Call Signaling and Media reservations that are not currently allocated.

As noted above, embodiments of the invention can reduce process delays in delay sensitive applications. A group communication/Push-to-Talk (PTT) system is an example of a delay sensitive system that can take advantage of reduced connection times offered by the communication signal bundling disclosed herein. For example, embodiments of the invention provide for an AT to send a request to turn on the reservations for needed QoS resources (e.g., In-Call Signaling and Media reservations for a PTT call) by transmitting a ReservationOnRequest message in the same access capsule as its connection request (e.g., ConnectionRequest+RouteUpdate) message. Optionally, a DataoverSignaling (DOS) message can be bundled in the same access capsule. If the In-Call Signaling forward and reverse QoS reservations are allocated at the time of the PTT call, the AT can request the Media QoS reservations to be turned on. These requests can be made as part of the ReservationOnRequest message.

The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communication system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as access terminals (ATs) 102, 108, and 302. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each At may be able to send and receive information in either a secure mode, or a non-secure (clear) mode. It should be understood that reference to an AT is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example, the request may be transmitted over the air to one from AT 102 or more MPTs (or base stations) 124. A BSC/PCF 122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to the RAN 120.

Figure 4:
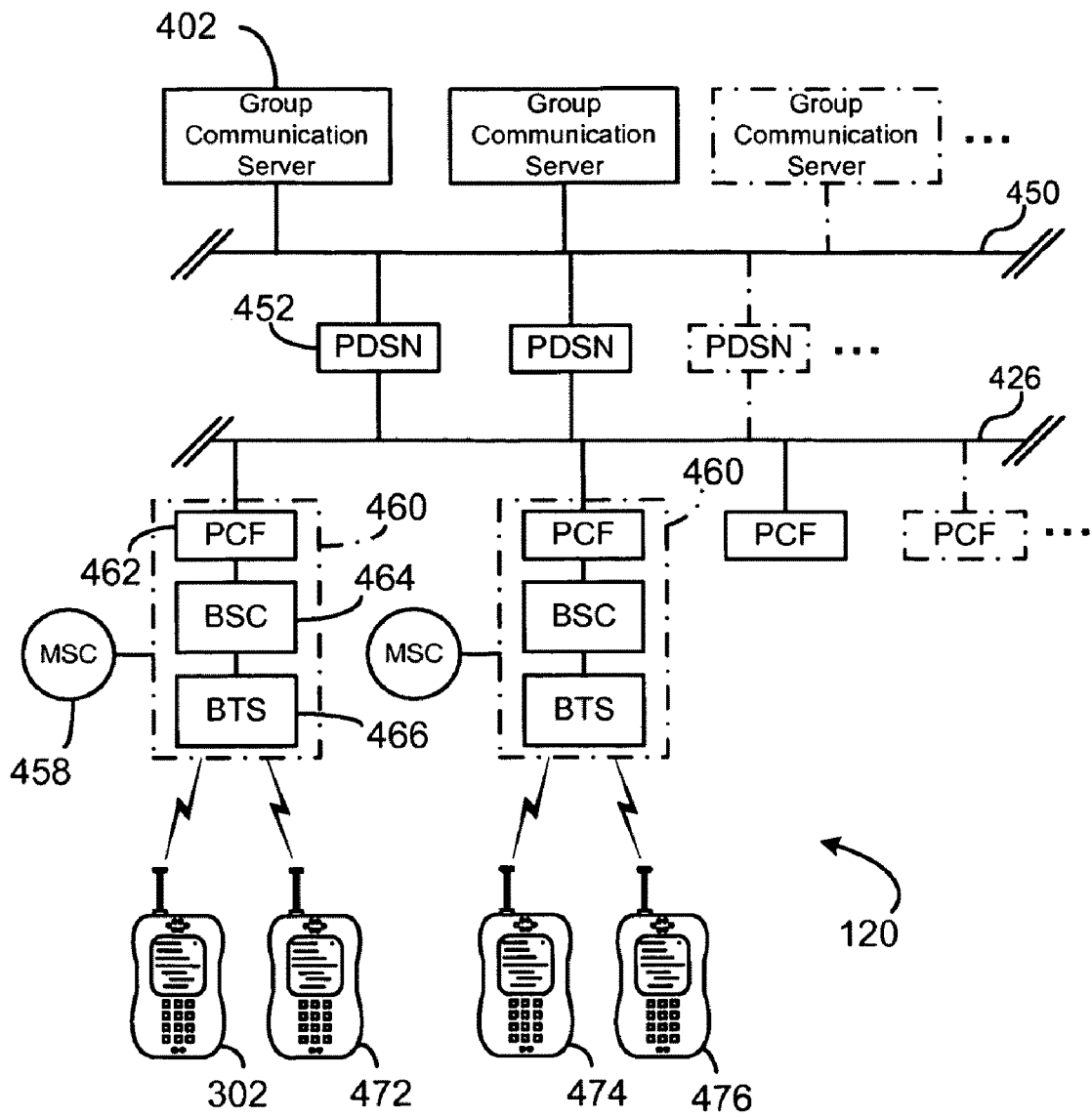
FIG. 4 is an illustration of a group communication system in accordance with at least one embodiment of the invention.

Referring to FIG. 4, one or more group communication servers 402 can monitor traffic of the group communication system through its connection to distributed network. Since the group communication server 402 can be connected to the distributed network through a variety of wired and wireless interfaces, geographic proximity to group participants is not necessary. Typically, a group communication server 402 controls communications between the wireless devices of set group members (ATs 302, 472, 474, 476) in a PTT system. The wireless network illustrated is merely exemplary and can include any system whereby remote modules communicate over-the-air between and among each other and/or between and among components of a wireless network including, without limitation, wireless network carriers and/or servers. Further, a series of group communication servers 402 can be connected to a group communication server LAN 450.

The group communication server(s) 402 can be connected to a wireless service provider's packet data service node (PDSN) such as PDSN 452, shown here resident on a carrier network 426. Each PDSN 452 can interface with a base station controller 464 of a base station 460 through a packet control function (PCF) 462. The PCF 462 may be located in the base station 460. The carrier network 426 controls messages (generally in the form of data packets) sent to a MSC 458. The MSC 458 can be connected to one or more base stations 460. In a similar manner to the carrier network, the MSC 458 is typically connected to the BTS 466 by both the network and/or Internet for data transfer and PSTN for voice information. The BTS 466 ultimately broadcasts and receives messages wirelessly to and from the wireless ATs, such as cellular telephones 302, 472, 474, 476, as is well known in the art. Accordingly, the general details of a group communication system will not be further discussed. Further, although the description herein discusses specific aspects of specific systems (e.g., PTT, QChat®, 1xEV-DO) to provide additional details and examples, embodiments of the invention are not limited to these specific illustrations.

As discussed above, the AT 302 requests a traffic channel in order to establish a communication (e.g., a PTT call). The PTT call can be originated by the originator AT 302 if both, traffic channel and QoS resources for In-Call Signaling and Media are available (additional details regarding the QoS resources are provided below and in FIG. 5). In the conventional systems, the AT 302 would have to establish the traffic channel connection with the AN 120 and then request the QoS resources. However, to reduce this delay in accordance with embodiments of the invention, the signaling messages need to establish the PTT call are bundled in the initial access channel message along with the original connection request.

1xEV-DO Revision A is designed to provide efficient access to packet data networks and is widely based on the Internet for its network architecture. Data traffic traversing Internet Protocol (IP) network elements at the PDSN 452, PCF 462, and RAN 120 can be based on standard Internet Engineering Task Force (IETF)-based protocols that support methods for differentiating traffic based on QoS requirements. QoS between the AT 302 and the 1xEV-DO Revision A network is configured as described in the 3GPP2 X.S0011-004-C Version 2.0 cdma2000 Wireless IP Network Standard: Quality of Service and Header Reduction specification, the contents of which are incorporated herein by reference. Data traffic transmitted over the air interface between the AT 302 and the RAN 120 can be configured for appropriate QoS treatment via 1xEV-DO Revision A protocols as described in the 3GPP2 C.S0024-A Version 3.0 document referenced above. 1xEV-DO Revision A provides standard mechanisms to offer intra-AT and inter-AT QoS. Intra-AT QoS provides differentiation of data streams belonging to the same user, while inter-AT QoS provides differentiation of packets belonging to different users.

To achieve QoS, traffic differentiation should be available end-to-end. All network components including the AT 302, RAN 120 (BTS 466, BSC 464), PDSN 452, and Internet routers should implement/support QoS. End-to-end QoS in 1xEV-DO Revision A networks can be achieved through the following mechanisms:

Packet Fitters: Packet filters at the PDSN map forward traffic flows to the AT and define the QoS treatment that should be applied to forward data traffic. The AT signals QoS requests that establish packet filters at that PDSN as described in the 3GPP2 X.S0011-004-C Version 2.0 cdma2000 Wireless IP Network Standard Quality of Service and Header Reduction specification.

QoS Profiles (Profile IDs): QoS Profiles and/or Profile IDs are a mechanism to specify (or predefine) relevant air interface parameters and network QoS requirements for a data service. It is a 'shorthand' identifier that the AT uses when requesting a QoS reservation for a flow with the RAN. Standard Profile ID assignments available for various data services are described in TSB58-G Administration of Parameter Value Assignments for cdma2000 Spread Spectrum Standards, the contents of which are incorporated herein by reference.

Reverse Traffic Marking: The AT can mark reverse traffic data in accordance with the Differentiated Services (DiffServ) framework and standards. These markings define the QoS network treatment requested for data outbound at the PDSN.

QoS in a 1xEV-DO Revision A network is also based on the proper mapping or binding of the following elements for the AT's PPP session, such as follows:

IP (Application) Flow: Application layer QoS requirements at the AT and PDSN are defined by identifying unique IP flows. A reservation label is associated with the IP flow to identify the QoS requirements for the flow between the AT and the RAN. An IP flow is then mapped onto an RLP flow that best satisfies the QoS requirements.

RLP (Link) Flow: Radio Link Protocol (RLP) flows are allocated based on QoS requirements (e.g., RLP parameter configuration) for upper layer flows. IP flows with the same QoS requirements can be mapped onto the same RLP flow. In the reverse direction, an RLP flow is mapped onto a (Reverse Traffic Channel Media Access Control) RTCMAC flow.

RTCMAC flow: RTCMAC flows are allocated based on QoS requirements that define physical layer latency and/or capacity needs for an upper layer flow. For example, flows can be low-latency or high capacity flows. RLP flows with the same QoS requirements can be mapped to the same RTCMAC flow.

Figure 5:
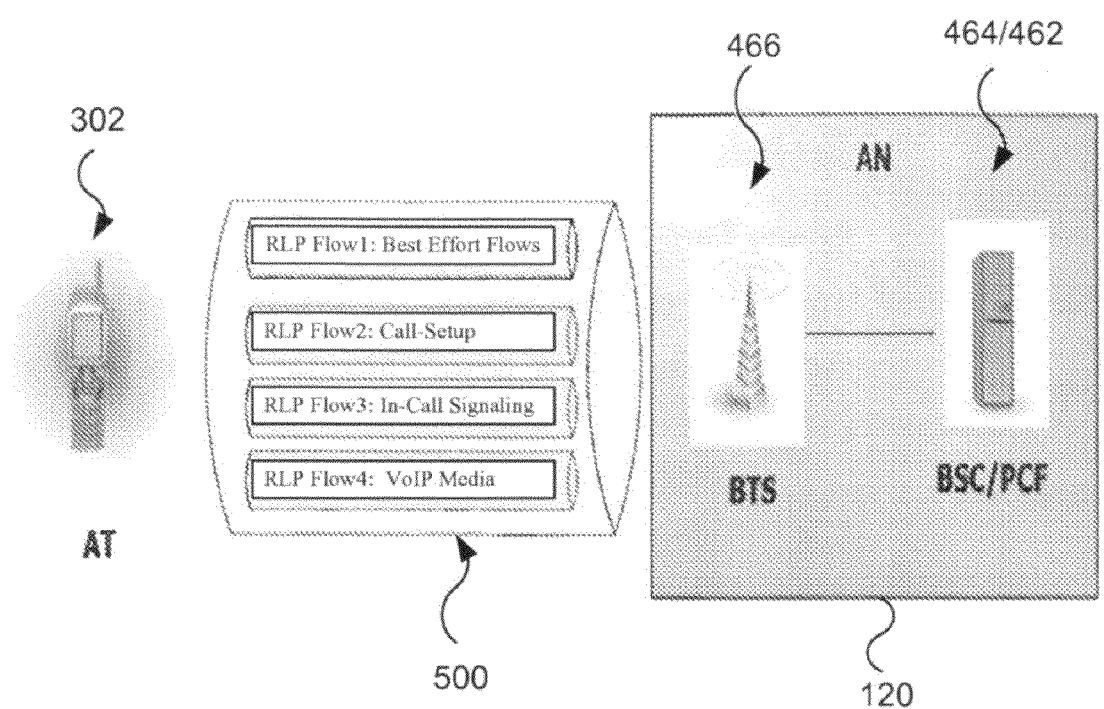
FIG. 5 is an illustration of Radio Link Protocol (RLP) flows in accordance with at least one embodiment of the invention.

FIG. 5 illustrates the multiple RLP flows 500 for a PTT-enabled AT 302 in communication with access network 120. The QoS requirements for each flow can be specified via QoS profiles. As noted above different applications can have different QoS requirements. For example, PTT over 1xEV-DO Revision A receives high priority and low latency data delivery through the specification of network QoS requirements. An exemplary PTT system can use the allocation of three IP flows at the AT, a flow for Call-Setup Signaling; a flow for In-Call Signaling; and a flow for Media. Each IP flow has specific QoS requirements and is mapped onto three separate RLP flows. The AT can further use a default Best Effort (BE) flow. QoS requirements for Media can be considered to be similar to VoIP media and therefore this RLP flow can be shared with VoIP.

Although the foregoing description provides many details specific to a PTT/QChat® system and the 1xEV-DO network to provide a detailed illustration of various aspects of embodiments of the invention, those skilled in the art will appreciate that embodiments of the invention are not limited to any specific application and/or network. Embodiments of the invention can include any application that has QoS requirements. Further, any network that can support the allocation of QoS resources bundled with the initial connection setup request can also be included in embodiments of the invention.

Figure 6:
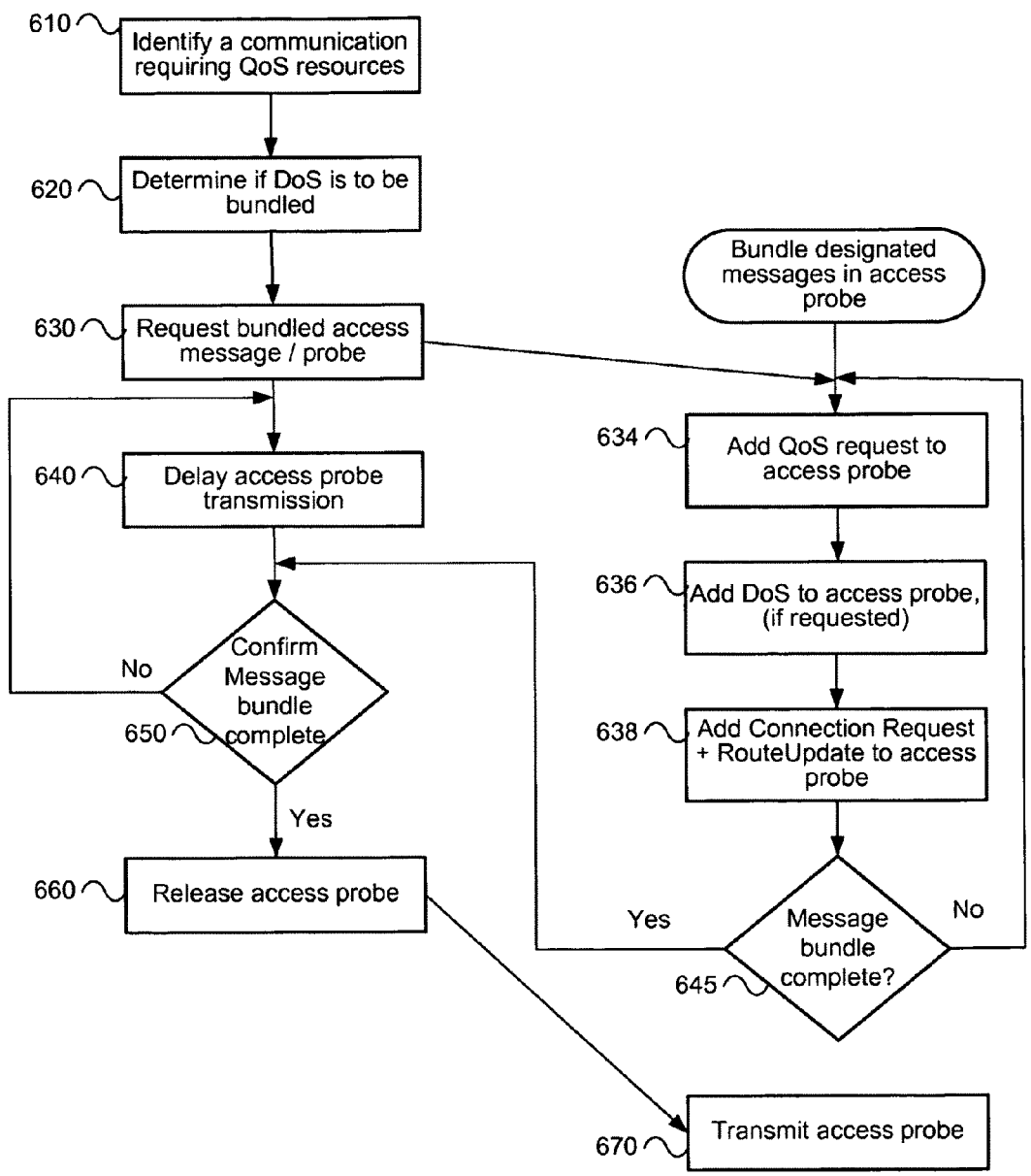
FIG. 6 is a flowchart in accordance with at least one embodiment of the invention.

Referring to FIG. 6, a flowchart illustrating the bundling process according to embodiments of the invention is provided. For example, the method can include an application identifying a communication to be requested requires QoS resources (e.g., a PTT call), in block 610. Additional messages can be considered for bundling (e.g., DOS message) 620, if the additional message is used and there is room in the access probe. A request for a bundled access message (e.g., access probe) can then be communicated from the application layer, in block 630, to lower layers for bundling of the requested messages in the access probe. As used herein the application layer can include the requesting application (e.g., a PTT client) and a bundling API that facilitates interface between the application layer and the lower layers (e.g., RLC, MAC, and Physical Layers). However, it will be appreciated that embodiments of the invention are not limited to this configuration. For example, the application itself could contain the functionality of the bundling API.

In block 634, after the receipt of the bundled request, the QoS request can be added to the access probe. Likewise, in block 636, the DOS message can be added to the access probe if requested and there is sufficient space in the access probe. Additionally, in block 638, the connection request and route update messages are added to the access probe. A check can be performed to determine whether the bundled message is complete, in block 645. If not, the process can loop back to check for the missing messages, as they may be delayed. A delay element (e.g., timer) can also be set at the application layer, in block 640, to allow for the bundling of the access probe. The process can loop via block 650 until the application layer receives an indication from the lower layers that the message bundling is complete 645 (or until the event is timed out and the access probe is sent). After receiving the confirmation, the access probe delay can be released, 660, and the access probe can be transmitted 670.

As discussed in the foregoing, the trigger (e.g., 310) can be any event that causes an application to initiate a connection request with QoS requirements, which are known to the application. The trigger may be activated manually via hard key or soft key activation, may be activated in response to a received signal (e.g., voice command, signal from the network, etc.) or may be activated in response to condition detected by the application.

Figure 7:
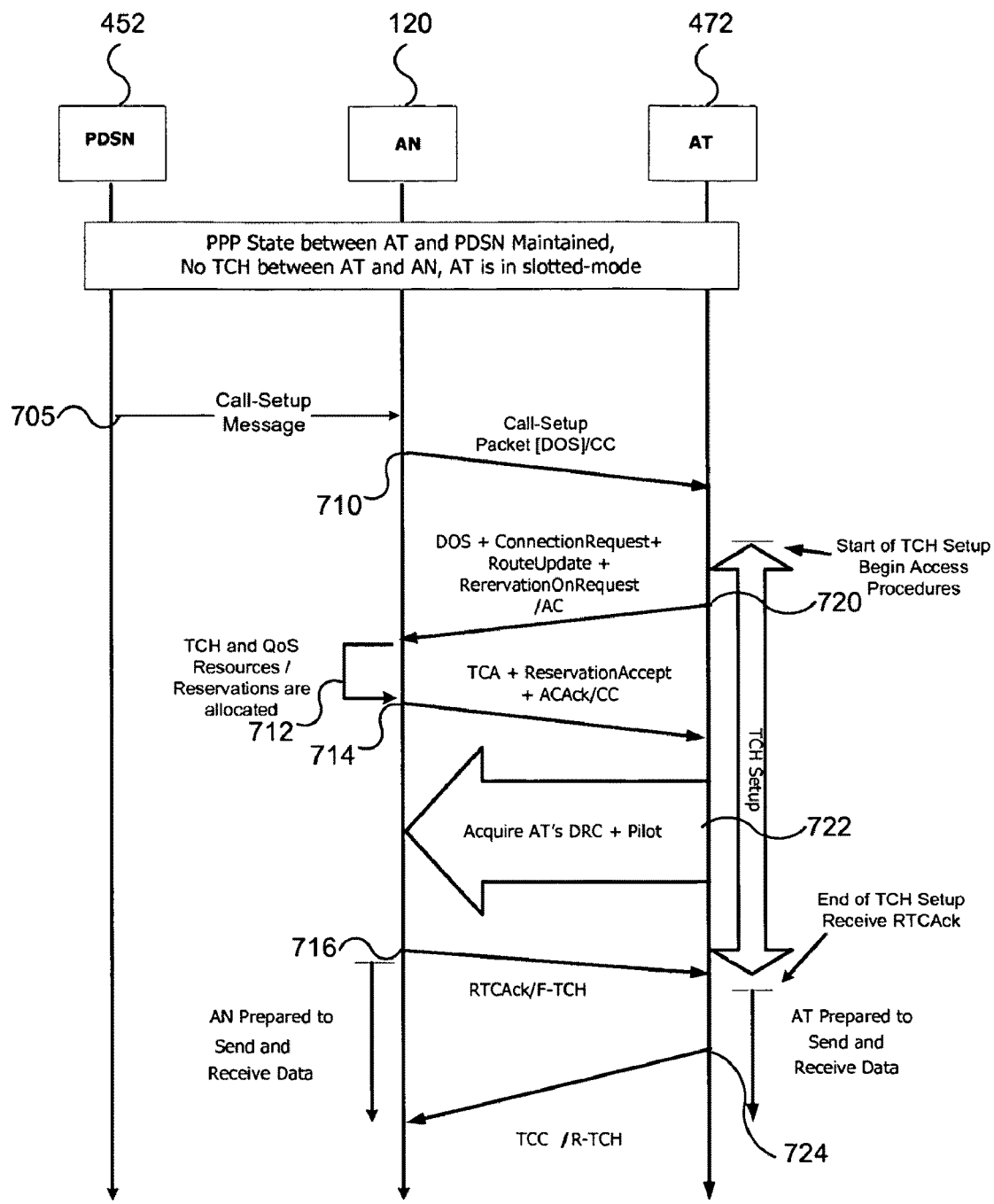
FIG. 7 is a signal flow diagram related to a target access terminal in accordance with at least one embodiment of the invention.

For example, as illustrated in FIG. 7, an access terminal (AT) 472, may receive a trigger, such as an announce message or call setup message, 705, in a PTT system. Specifically, a call setup message, 705, can be transmitted via PDSN 452 and AN 120. Access network 120 can forward the call setup message over a control channel, 710, to the target AT 472. Upon receipt and decoding of the call setup packet, AT 472 can determine that the requested communication (e.g., a PTT call) uses QoS resources. Accordingly, the call setup message received from the network can serve as a trigger to initiate the bundling of the subsequent response.

For example, AT 472 can respond with a bundled request, 720, including a connection request (e.g., ConnectionRequest, +RouteUpdate), a QoS reservation (e.g., ReservationOnRequest) and optionally an application layer message (e.g., DOS) on an access channel. Including the DOS allows for application data to be sent to a destination prior to establishing a traffic channel. Requesting the QoS resources allows for the allocation of the need QoS resources prior to establishing the traffic channel. Accordingly, the responsiveness of the communication system may be improved. Upon receipt of the connection request a traffic channel and requested resources can be allocated, 712, at access network (AN) 120. The traffic channel assignment (TCA), QoS resources acceptance, and acknowledgement of the access channel message can be transmitted, 714, to AT 472. The traffic channel setup can continue in 722, 716 and 724, until both the AN 120 and AT 472 are prepared to send and receive data as discussed in the foregoing and known in the art. Accordingly, a detailed explanation will not be provided.

In view of the foregoing disclosure, those skilled in the art will recognize that embodiments of the invention include methods of performing the sequence of actions, operations and/or functions previously discussed. For example, a method for transmitting communication signals in a wireless network can include bundling a connection request and a reservation for QoS resources into an access message at an access terminal, and transmitting the access message to an access network. The bundled message can further include an application layer message (e.g., DOS message) that is bundled with the connection request and the reservation into the access message.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly an embodiment of the invention can include an apparatus including logic configured to bundle a connection request and a reservation for QoS resources into an access message and logic configured to transmit the access message to an access network. The apparatus can further include logic configured to bundle an application layer message with the connection request and the reservation into the access message. The various logical elements can be integrated into one device or can be distributed over several devices each operably couple to one another. For example, the apparatus can be an access terminal or similar wireless computing device.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for bundling communication messages in a wireless network comprising: code for causing a computer to bundle a connection request and a reservation for QoS resources into an access message, and code for causing a computer to transmit the access message to an access network. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for transmitting communication signals in a wireless network comprising:
   bundling a connection request and a reservation for Quality of Service (QoS) resources into an access message at an access terminal; and
   transmitting the access message to an access network.

2. The method of claim 1, further comprising:
   bundling an application layer message with the connection request and the reservation for QoS resources into the access message.

3. The method of claim 2, wherein the application layer message is a DataOverSignaling (DOS) message.

4. The method of claim 3, wherein the DOS message contains a request to establish a push-to-talk call.

5. The method of claim 1, wherein the access message is transmitted over an access channel in an access probe.

6. The method of claim 1, wherein bundling further comprises:
   delaying the transmission of the access message until the connection request and the reservation for QoS resources messages are bundled.

7. The method of claim 6, further comprising:
   communicating a bundling request to bundle the connection request and the reservation for QoS resources messages from an application layer to lower layers in the access terminal.

8. The method of claim 1, further comprising:
   detecting QoS resources currently allocated to the access terminal; and
   wherein the reservation for QoS resources includes QoS resources used for the communication not currently allocated.

9. The method of claim 1, wherein the QoS resources include In-Call Signaling and Media reservations.

10. The method of claim 1, further comprising:
    receiving an indication that insufficient QoS resources are available at the access network; and
    establishing a connection with the access network without the allocated QoS resources.

11. The method of claim 1, further comprising:
    receiving a traffic channel assignment and reservation accept message indicating that QoS resources are available at the access network; and
    establishing a connection with the access network having an allocated QoS resources.

12. The method of claim 1, further comprising:
    detecting a trigger prior to performing the bundling.

13. The method of claim 12, wherein the trigger is detected at an application layer and wherein the trigger is at least one of a hard key activation, a soft key activation, a response to a received signal or a response to a condition detected by an application.

14. An access terminal comprising:
    logic configured to bundle a connection request and a reservation for Quality of Service (QoS) resources into an access message; and
    logic configured to transmit the access message to an access network.

15. The access terminal of claim 14, further comprising:
    logic configured to bundle an application layer message with the connection request and the reservation for QoS resources into the access message.

16. The access terminal of claim 15, wherein the application layer message is a DataOverSignaling (DOS) message containing a request to establish a push-to-talk call.

17. The access terminal of claim 14, further comprising:
    logic configured to detect QoS resources currently allocated to the access terminal; and
    wherein the reservation for QoS resources includes QoS resources used for the communication not currently allocated.

18. A non-transitory computer-readable medium including code stored thereon for bundling communication messages in a wireless network comprising:
    code for causing the computer to bundle a connection request and a reservation for Quality of Service (QoS) resources into an access message; and code for causing the computer to transmit the access message to an access network.

19. The non-transitory computer-readable medium of claim 18, further comprising:
code for causing the computer to bundle an application layer message with the connection request and the reservation for QoS resources into the access message.

20. The non-transitory computer-readable medium of claim 19, wherein the application layer message is a DataOverSignaling (DOS) message containing a request to establish a push-to-talk call.

21. The non-transitory computer-readable medium of claim 18, further comprising:
code for causing a computer to detect QoS resources currently allocated to the access terminal; and
wherein the reservation for QoS resources includes QoS resources used for the communication not currently allocated.

22. An apparatus comprising:
means for bundling a connection request and a reservation for Quality of Service (QoS) resources into an access message; and
means for transmitting the access message to an access network.

23. The apparatus of claim 22, further comprising:
means for bundling an application layer message with the connection request and the reservation for QoS resources into the access message.

24. The apparatus of claim 23, wherein the application layer message is a DataOverSignaling (DOS) message containing a request to establish a push-to-talk call.

25. The apparatus of claim 22, further comprising:
means for detecting QoS resources currently allocated to an access terminal; and
wherein the reservation for QoS resources includes QoS resources used for the communication not currently allocated.

26. A method for reducing connection times in a wireless network comprising:
bundling a connection request and a reservation for allocation of QoS resources into an access message at an access terminal, wherein the reservation for the allocation of QoS resources comprises a QoS profile predefining QoS requirements; and
transmitting the access message to an access network to allow the QoS reservations to be allocated to the access terminal prior to establishing a traffic channel.

* * * * *